US006622745B1

(12) United States Patent
Smith et al.

(10) Patent No.: US 6,622,745 B1
(45) Date of Patent: Sep. 23, 2003

(54) FLUID WASTER DIVERSION SYSTEM

(75) Inventors: Craig Roland Smith, Chandler, AZ (US); David A. White, Chandler, AZ (US)

(73) Assignee: Projex IMS, Inc., Chandler, AZ (US)

( * ) Notice: Subject to any disclaimer, the term of this patent is extended or adjusted under 35 U.S.C. 154(b) by 84 days.

(21) Appl. No.: 10/042,915

(22) Filed: Jan. 7, 2002

(51) Int. Cl.[7] .............................. B01D 17/12; C02F 1/00
(52) U.S. Cl. ...................... 137/2; 137/119.1; 137/87.06; 210/96.1; 210/745; 451/60; 451/446
(58) Field of Search .............................. 137/2, 119.01, 137/119.1, 87.06; 210/96.1, 104, 143, 745; 451/36, 60, 446

(56) References Cited

U.S. PATENT DOCUMENTS

| 3,253,711 | A | * | 5/1966 | Young ........................ 210/745 |
| 3,809,243 | A | * | 5/1974 | Teders ....................... 210/96.1 |
| 4,064,893 | A | * | 12/1977 | Pitt ........................ 137/115.01 |
| 4,649,281 | A | * | 3/1987 | Schmitt et al. ............. 210/96.1 |
| 5,207,921 | A | * | 5/1993 | Vincent ....................... 210/745 |
| 5,647,989 | A | | 7/1997 | Hayashi et al. |
| 5,664,990 | A | | 9/1997 | Adams et al. |
| 5,681,482 | A | * | 10/1997 | Reber ....................... 210/96.1 |
| 5,783,084 | A | | 7/1998 | Suenkonis |
| 5,895,315 | A | | 4/1999 | Pinder, Jr. |
| 6,001,265 | A | | 12/1999 | Toyama et al. |
| 6,161,533 | A | | 12/2000 | Katsumata et al. |
| 6,231,628 | B1 | | 5/2001 | Zavattari et al. |
| 6,244,929 | B1 | | 6/2001 | Russ et al. |
| 6,482,325 | B1 | * | 11/2002 | Corlett et al. ................. 451/60 |

* cited by examiner

*Primary Examiner*—Michael Powell Buiz
*Assistant Examiner*—Ramesh Krishnamurthy
(74) *Attorney, Agent, or Firm*—LaValle D. Ptak

(57) ABSTRACT

A waste diversion system for diverting the effluent from a manufacturing process, such as polishing the surfaces of silicon wafers, has an electrically controlled diverter valve for receiving the effluent and diverting it either to a "dirty" output for waste treatment, or to a "clean" output for recycling or other treatment. To determine whether the effluent is "dirty" or "clean", parameter sensors are located to sense particular parameters such as turbidity, conductivity, ORP, pH, or ion content, as desired. One sensor is located to sense the parameters of effluent flowing into the diverter valve; and the other sensor is located to sense the parameters (typically, the same parameters) of the flow from the "dirty" or waste side of the diverter valve. Only when both of the sensors indicate that the effluent is "clean" is a signal provided to the diverter valve to switch it to the clean output. As soon as the sensor on the input side of the valve indicates that the effluent is no longer "clean", the valve control switches back to divert the effluent to the "dirty" or waste output. Only when both sensors once again determine that the effluent is "clean" (that is, coming into the valve and being expelled into the waste outlet), is the valve control again operated to divert the effluent to the "clean" output.

11 Claims, 1 Drawing Sheet

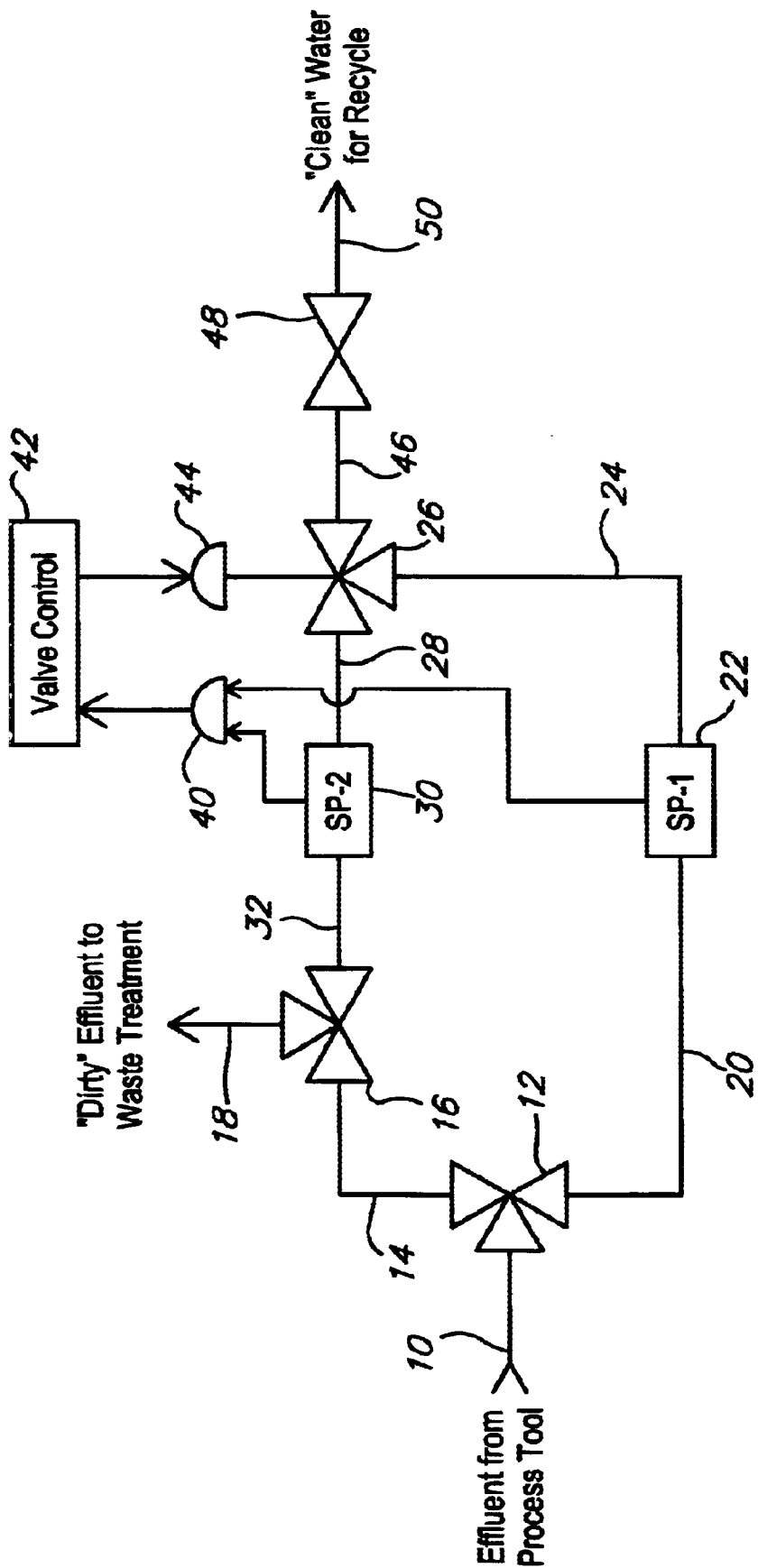

FLUID WASTER DIVERSION SYSTEM

BACKGROUND

In the production of silicon wafers for use in integrated circuit manufacturing, a final step is the polishing of the wafer surface with very fine abrasive particles carried in a water solution. The water which is used for this solution typically is obtained from de-ionization, reverse osmosis systems. As a consequence, the water used in the abrasive slurry is quite expensive; and large quantities are used. If a substantial portion of this expensive water can be recovered and re-used, it is worth the effort, both from the saving of the initial feed water itself, as well as savings in the RO/DI process.

Systems have been developed in an effort to improve the efficiency of wafer polishing systems. The U.S. patent to Russ U.S. Pat. No. 6,244,929 is directed to a polishing system with continuous filtration. In order to accomplish the continuous filtration, two parallel filtration paths are employed. At any given time, one of the paths is used to receive slurry from a reservoir and supply it to a polisher. Simultaneously, the other path is backflushed, with the backflush being obtained from a de-ionized water supply and then diverted to a drain. At periodic intervals, the valves are switched; so that the newly backflushed side then is used to provide slurry from the reservoir to the polisher, while the other side is being backflushed. There is no showing of re-use of effluent after the polishing operation under the control of any sensors.

The U.S. patent to Pinder No. 5,895,315 is directed to a recovery device for a polishing agent and de-ionizing water for a polishing machine. The system of this patent, however, does not employ any effluent sensing to control the recovery of any of the materials used in the system. All switching of the valves is accomplished through the electronic control unit, which receives signals from the polishing machine itself. Effluent sensing, however, is neither disclosed nor discussed in the Pinder patent.

The U.S. patents to Hayashi U.S. Pat. No. 5,647,989; Adams U.S. Pat. No. 5,664,990; Toyama U.S. Pat. No. 6,001,265; Katsumata U.S. Pat. No. 6,161,533; and Zavattari U.S. Pat. No. 6,231,628 all are directed to slurry recycling or recovery and separation. None of these patents, however, use any sensors for sensing the condition of an effluent on a continuous basis to switch or divert the effluent from one output to another, as determined by the clarity or other chemical condition of the effluent.

A system has been developed for diverting effluent from a silicon wafer polishing process to either a dirty output or a clean output for appropriate further processing. This system employs a sensor at the input side of a diverter valve to determine the "clear" or "dirty" condition of the effluent. A signal from the sensor then is utilized to operate the diverter valve accordingly. As a backup, a second process sensor is located on the "clean" or clear water output side; so that if any "dirty" effluent reaches the clean side when the valve is switched to divert effluent to the clean side, the valve then is switched to divert the effluent to the dirty side. Because of the locations of these sensors, however, it is possible for short bursts of "dirty" effluent to reach the "clean" side of the diverter valve when the condition of the effluent in the input side of the valve changes.

Accordingly, it is desirable to provide a fluid diversion system, particularly suitable for utilization with the effluent from a wafer polishing system, which overcomes the disadvantages of the prior art, and which ensures accurate diversion of clean water to a reclamation outlet.

SUMMARY OF THE INVENTION

It is an object of this invention to provide an improved fluid diversion system and method.

It is another object of this invention to provide an improved waste water diversion system and method.

It is an additional object of this invention to provide an improved waste water diversion and recovery system and method.

It is a further object of this invention to provide an improved waste water diversion and recovery system for the recovery of recyclable waste water from effluent from industrial processing operations.

In accordance with a preferred embodiment of this invention, a fluid waste diversion system and method is supplied with a source of fluid effluent. A diverter valve has an input coupled to receive the fluid effluent; and this valve is operated to divert the fluid from the effluent to one or the other of first and second outputs. Fluid parameter sensors are placed to sense particular parameters of the fluid supplied to the input of the diverter valve and to sense particular fluid parameters from the fluid supplied to the first output. The diverter valve initially is set to supply fluid to the first output. When the signals from the sensors simultaneously indicate a predetermined condition of the sensed parameters, a control circuit is operated to switch the diverter valve to supply the effluent to the second output. At any time one or the other or both of the sensors indicates that the predetermined parameter conditions are not met, the valve is switched back to the original condition supplying the effluent from its input to the first output.

BRIEF DESCRIPTION OF THE DRAWING

The sole FIGURE of the drawing is a schematic block diagram of a preferred embodiment of the invention.

DETAILED DESCRIPTION

Reference now should be made to the drawing, which depicts the fluid flow path and a schematic electrical control circuit for a preferred embodiment of the invention. The embodiment shown in the drawing primarily is designed for diverting effluent from a silicon wafer polishing operation to one or the other of two different outputs. One of these outputs is for "dirty" effluent for waste treatment processing. The other output is for "clear" effluent for recycling in the wafer polishing system.

In a final step in the production of silicon wafers for use in integrated circuit manufacturing, the wafer surface is polished with very fine abrasive particles carried in a water solution. The so-called slurry which is formed by the suspension of the abrasive particles in the water is nearly clear to the naked eye; but once the suspended solids in the slurry exceed a predetermined amount, the slurry must be diverted to wastewater and discarded, or reprocessed.

The water which is used for the polishing operation typically is obtained from de-ionized, reverse osmosis system; and consequently, this water is quite expensive. The system and the method for operating the system which is shown in the drawing is designed to recover a substantial portion of this expensive water for re-use, thereby significantly lowering the overall cost of the operation of the polishing tool and in addition, effecting a significant saving in the water which originally is supplied to the reverse osmosis system for use in conjunction with the polishing tool.

In the system which is shown in the drawing, the effluent from the polishing tool, which includes suspended solids to form the effluent slurry, is supplied to the input of a manually operated diverter valve 12 over a water or effluent supply line 10. It should be noted, in conjunction with the drawing, that the heavy lines which are used in the drawing are indicative of fluid flow paths, whereas the thinner lines comprise electrical control signal paths.

At system startup and during the normal automatic control operation of the system, the valve 12 is operated to divert effluent from the input line 10 out through the lower side of the valve (as viewed in the drawing) over a line 20 through a parameter sensor position or sensor 22, and a line 24 which constitutes the input line for an electrically controlled diverter valve 26. At the time of initial operation, the valve 26 is operated to divert fluid applied through its input over the line 24 to its left-hand output supplying waste effluent over a line 28. This waste passes through another parameter sensor 30 to the right-hand input of a manually operated valve 16 to then supply the effluent to waste treatment over a line 18. Again, it should be noted that the valves 12 and 16 are normally operated so that the valve 12 supplies fluid to the line 20, and the valve 16 receives fluid from the line 32 and discharges over the line 18. Except for conditions which are described subsequently, no change in the positions of the valves 12 and 16 takes place during normal operation of the system.

Effluent which is capable of re-use, either directly or through a modest amount of reconditioning, and which is identified in the drawing as "clean" water for recycling is saved. This is controlled by means of the parameter sensors 22 and 30 which supply signals through an AND gate 40 to a valve control circuit 42. The control circuit 42 operates to control the operation of the valve 26 through an operator 44. So long as the parameter being sensed indicates that the effluent is too dirty or contaminated for supplying it to the clean water output line 46, the original condition of the system which has been described above is maintained.

The parameter sensors 22 and 30, however, are used to sense one or more parameters or conditions of the fluid or water flowing through the lines 20 and 28, respectively. These conditions may be turbidity, conductivity, ORP, pH, or ion specific measurements. Sensors of the type which may be employed at 22 and 30 may be of any suitable, commercially available standard types for measuring the particular condition which is being monitored.

For purposes of illustration, assume that the sensors 22 and 30 are turbidity sensors which provide a "low" output on the lead connected to one of the two inputs of the AND gate 40 from each sensor whenever the turbidity of the fluid which is being monitored by the respective sensor is greater than some pre-established level of acceptance. The level of turbidity which changes the signal from either of the sensors 22 and 30 may be set in accordance with operating standards established by the user of the system. It should be noted, however, that the sensors 22 and 30 provide a first or "low" signal at their outputs, constituting the inputs to the AND gate 40, when the turbidity exceeds a threshold level, and provide a second or "high" output whenever the turbidity sensed by the particular one of the sensors 22 or 30 falls below this threshold level.

With the system started in the condition mentioned above, the continued supply of water with a turbidity level (or any one of the various other parameters which can be sensed) exceeds the amount which is set for a threshold for "dirty" effluent, with fluid flows from the line 10 through the valve 12, the lines 20 and 24, and through the valve 26 and the lines 28 and 32 to the output valve 16, which discharges the fluid over the output line 18. When the system is used in conjunction with wafer polishing tools, however, a relatively large proportion of the effluent which is supplied over the input line 10 to the valve 12 is not sufficiently contaminated to cause it to be treated as dirty or waste water or effluent. For example, if the turbidity (which is being sensed by the sensors 22 and 30 in the example under consideration) falls below the threshold level of the sensor 22, its output will shift from a "low" to a "high" output. This alone, however, will not change the output of the AND gate 40, since, at least at this time, the output from the sensor 30 is "low", thereby causing the output of the AND gate to remain "low". As a consequence, the clean fluid or water initially passing through the valve 26 is discharged through the line 28 to the sensor 30. At such time, however, as the clear or clean water sensed by the sensor 22 also reaches the sensor 30, the output of the sensor 30 goes from "low" to "high"; and a high output is obtained from the AND gate 40. This output is supplied to the valve control circuit 42, which may be of any suitable type responding to a signal at its input. The valve control 42 then supplies a signal to the electrical control 44 of the valve 26, switching the valve 26 to discharge fluid coming in on its inlet or input side from the line 24 out through the line 46. As shown in the drawing, the line 46 also is supplied through an on/off valve 48, and ultimately out through a line 50, which constitutes the "clean" fluid or water discharge for the system.

So long as the sensor 22 continues to sense a low turbidity (or any other one of the parameters below a pre-established threshold), the system operates to supply effluent from the line 10 through the valves 12 and 26 to the clean water line 50. Whenever the effluent supplied over the line 20, however, once again becomes contaminated or includes a turbidity above the threshold of the sensor 22, the sensor 22 immediately operates to shift the signal back from a "high" output to a "low" output. This in turn causes the output of the AND gate 40 immediately to go "low", irrespective of the output of the sensor 30; so that the valve control circuit 42 operates through the control 44 of the valve 26 to divert it back to its original condition, turning off the flow through the line 46 and resuming the flow through wastewater effluent line 28.

The initial surge of fluid supplied over the line 28 immediately following the operation of the diversion valve, may be "clean" as sensed by the sensor 30; but since the fluid sensed by the sensor 22 is above the threshold parameter, the AND gate 40 continues to provide a low output. As soon as "dirty" or fluid or water in excess of the measured parameter passes through the sensor 30, it senses the condition has exceeded the threshold, and it also, as with the sensor 22, then switches from a "high" to a "low" output, causing the output of the AND gate 40 to remain low.

From the foregoing, it can be seen that at no time, with the sensors located in the positions shown in the drawing, namely at the inlet side of the diverter valve 26 and at the dirty water outlet side of the valve 26, will any "dirty" effluent be supplied over the line 46 to the clean water output 50. Only when clean fluid or water is sensed in the "dirty" or waste side of the diverter valve 26 simultaneously with sensing of clean fluid or water to its input, is the valve 26 ever operated to divert fluid flowing into its input over the line 24 to the clean water output line 46, the valve 48, and ultimately to the line 50.

Although the foregoing description has been made in conjunction with the sensing of turbidity of the water effluent, any one or combinations of the various possible parameters which may be utilized for sensing the water condition may be sensed by the sensors 22 and 30, or multiple banks or series of individual sensors. The operation is the same, irrespective of the particular parameters which the sensors 22 and 30 measure.

For maintenance of the system or whenever recovery of "clean" fluid or water is not desired, the valves 12 and 16 may be operated to direct effluent from the line 10 through the valve 12, the line 14 and the valve 16 to the line 18 directly. This entirely bypasses the automatic control system described above.

It also should be noted that in the foregoing description, the power supplies for supplying operating power to the sensors, the valve control system and the electrically operated valve 26 have not been shown. Only the control signal lines are illustrated, since the electrical interconnections of the various parts are conventional and are well known.

The foregoing description of the preferred embodiment of the invention should be considered illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A fluid recovery system including in combination:

a source of fluid effluent;

a diverter valve with an input coupled to receive fluid from the source of fluid effluent and having first and second outputs for selectively diverting fluid to the first or second output thereof;

a first fluid parameter sensor coupled to sense a predetermined threshold level of a parameter of the fluid effluent before the input of the diverter valve;

a second fluid parameter sensor coupled to sense a predetermined threshold level of parameter of fluid at the first output of the diverter valve; and a valve control circuit coupled with the first and second sensors and responsive to sensing of the predetermined parameters of fluid by both the first and second fluid parameter sensors to operate the diverter valve to direct fluid at the input thereof to the second output thereof, and further operating the diverter valve to direct fluid to the first output thereof when at least one of the first and second fluid parameter sensors senses a level of a predetermined parameter of fluid above the predetermined threshold level thereat.

2. The fluid recovery system according to claim 1 wherein the first and second fluid parameter sensors operate to sense the same predetermined parameter of fluid.

3. The fluid recovery system according to claim 2 wherein the parameter sensed by the first and second fluid parameter sensors is the turbidity of the fluid flowing into the input of the diverter valve and flowing out of the first output of the diverter valve to cause the diverter valve to direct fluid to the second output thereof when the turbidity sensed by both sensors is below a predetermined threshold.

4. The fluid recovery system according to claim 3 wherein fluid flowing out of the first output of the diverter valve is supplied to waste and the fluid flowing out of the second output of the diverter valve is recycled for re-use.

5. The fluid recovery system according to claim 4 wherein the fluid is water.

6. The fluid recovery system according to claim 1 wherein the parameter sensed by the first and second fluid parameter sensors is the turbidity of the fluid flowing into the input of the diverter valve and flowing out of the first output of the diverter valve to cause the diverter valve to direct fluid to the second output thereof when the turbidity sensed by both sensors is below a predetermined threshold.

7. The fluid recovery system according to claim 6 wherein fluid flowing out of the first output of the diverter valve is supplied to waste and the fluid flowing out of the second output of the diverter valve is recycled for re-use.

8. The fluid recovery system according to claim 1 wherein the fluid is water.

9. A method for recovering fluid from fluid effluent for recycling including the steps of:

supplying the fluid effluent to a diverter valve having a first output for disposing of fluid to waste and a second output for diverting fluid for re-use;

continuously monitoring at least one parameter of the fluid flowing into the input of the diverter valve and out of the first output thereof to determine the condition of fluid at both of the locations being monitored; and operating the diverter valve to divert fluid flowing into the input thereof to the second output thereof when the monitoring of fluid both at the input of the diverter valve and at the first output thereof simultaneously indicate a predetermined condition of the monitored parameter.

10. The method according to claim 9 wherein the parameter being monitored is the turbidity of the fluid.

11. The method according to claim 9 wherein the parameter being monitored is the turbidity of the fluid and the valve is operated to divert fluid to the re-use output thereof when the turbidity monitored at both the input to the valve and the first output thereof falls below a predetermined amount.

* * * * *